UNITED STATES PATENT OFFICE.

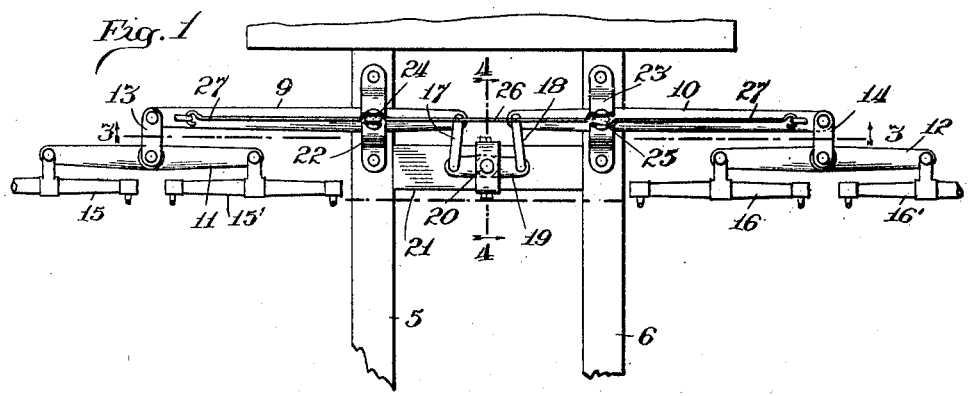
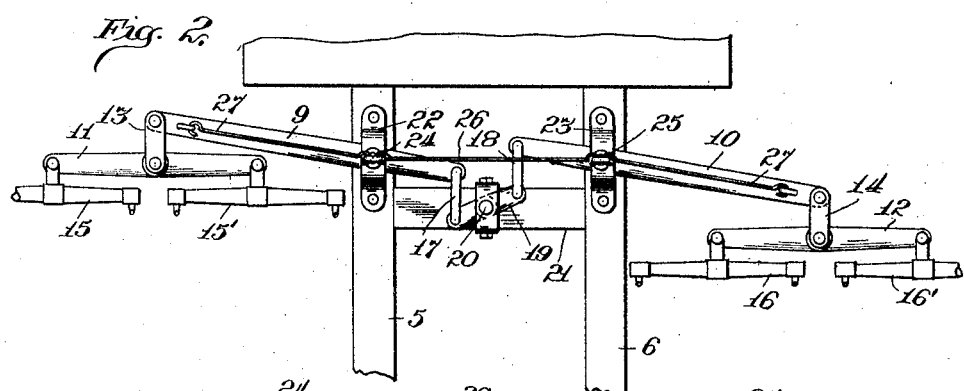
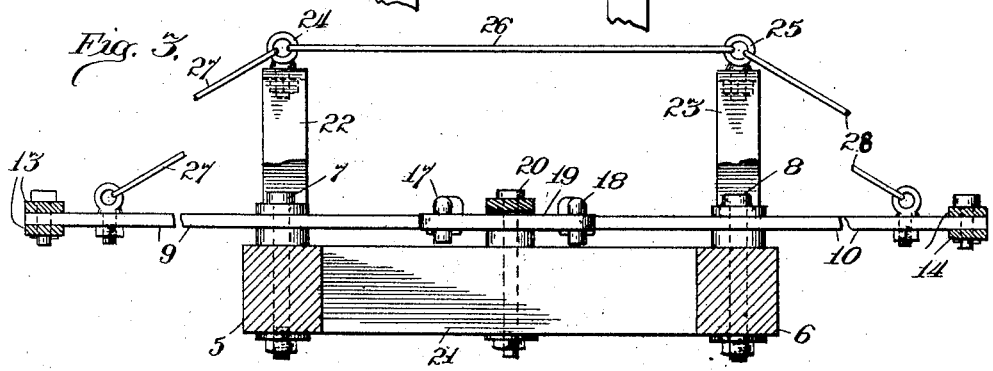
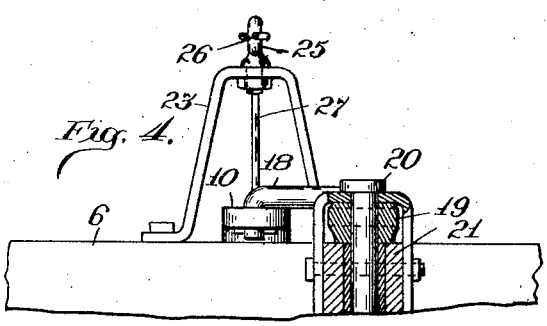

GEORGE D. HOUSTON, OF RUSHVILLE, ILLINOIS.

FOUR-HORSE EVENER.

1,321,638.  Specification of Letters Patent.  Patented Nov. 11, 1919.

Application filed April 29, 1918. Serial No. 231,308.

*To all whom it may concern:*

Be it known that I, GEORGE D. HOUSTON, a citizen of the United States, residing at Rushville, in the county of Schuyler and State of Illinois, have invented certain new and useful Improvements in Four-Horse Eveners, of which the following is a specification.

My invention relates to a four horse evener particularly adapted for use in connection with farm machinery although not necessarily limited to such use, and has for its primary object the provision of an evener which insures distribution of the load equally to each of four horses so that the latter are required to do their proportionate share of the work.

Further objects and advantages of my invention will be apparent as it is better understood by reference to the following specification when read in connection with the accompanying drawing, illustrating the preferred embodiment thereof, in which—

Figure 1 is a plan view of the invention;

Fig. 2 is a similar view showing a slightly different position of the parts;

Fig. 3 is a section on the line 3 of Fig. 1, and

Fig. 4 is a section on the line 4—4 of Fig. 1.

Referring to the drawing 5 and 6 indicate draft tongues of a vehicle such for example as a cultivator. Pivotally mounted on bolts 7 and 8 extending through the respective tongues are a pair of levers 9 and 10. The pivotal axes of the levers 9 and 10 are spaced from the inner ends of the levers a distance approximately equal to one-third the length thereof. Double trees 11 and 12 are connected by links 13 and 14 to the outer ends of the levers 9 and 10 and in turn support swingle trees 15, 15', 16 and 16' to which the horses are attached. The inner or shorter arms of the levers 9 and 10 are connected by links 17 and 18 to a lever 19 pivoted at its center on a bolt 20 extending through a cross bar 21 which connects the tongues 5 and 6. To insure that the levers 9 and 10 remain substantially horizontal when the evener is in use, I provide two U-straps 22 and 23 bolted respectively to the tongues 5 and 6. Swivels 24 and 25 are mounted in the tops of the straps 22 and 23 and are connected by a link 26. Links 27 connect the swivels 24 and 25 to the levers 9 and 10 adjacent the outer ends of the latter. This structure supports the outer ends of the levers 9 and 10 while permitting them to swing on their pivots as is essential to the proper functioning of the evener.

The operation of the evener will be readily understood by reference to the drawing and particularly Fig. 2. The horses are connected to the swingle trees 15 15' 16 and 16' and the draft forces are transmitted through the double trees 11 and 12 which distribute the load between the horses of each pair on opposite sides of the tongues, through the links 13 and 14 and levers 9 and 10 to the tongues. The levers 9 and 10 being pivoted and connected to each other through the links 17 and 18 and the lever 19, any tendency of one pair of horses to travel more rapidly than the other results in pivotal movement of the levers 9 and 10 to positions corresponding to those indicated in Fig. 2. The relation of the levers 9 and 10 is of course constantly changing with the movement of the horses, but in any position each horse is required to pull his full proportion of the load.

The structure as above described is exceedingly simple and inexpensive and results in an exact distribution of the load. Applicant is enabled by reason of his invention to obtain the desired result without adding unnecessary weight and complication to the cultivator or other apparatus to which the evener is applied.

Various changes may be made in the form, arrangement and construction of the parts, without departing from the spirit or scope of the invention or sacrificing any of its material advantages, the form hereinbefore described being merely a preferred embodiment thereof.

I claim:

1. A four horse evener comprising a pair of levers pivoted to swing horizontally, means connecting the inner ends of said levers, means for connecting a pair of horses to the outer end of each of said levers, U-straps mounted above the pivotal axes of said levers and links connecting said U-straps and levers.

2. A four horse evener comprising a pair of levers pivoted to swing horizontally, means connecting the inner ends of said levers, means for connecting a pair of horses to the outer end of each of said levers, U-straps mounted above the pivotal axes of said levers, links connecting said U-straps and levers, and a link connecting said U-straps.

GEORGE D. HOUSTON.

Witnesses:
 KATE B. BAGBY,
 BRUCE SHINDEL.

Copies of this patent may be obtained for five cents each, by addressing the "Commissioner of Patents, Washington, D. C."